United States Patent
Mori et al.

(10) Patent No.: US 9,160,908 B2
(45) Date of Patent: Oct. 13, 2015

(54) IMAGING APPARATUS

(71) Applicants: SHARP KABUSHIKI KAISHA, Osaka-shi, Osaka (JP); J.S.T. MFG. CO., LTD., Osaka-shi, Osaka (JP)

(72) Inventors: Mitsuo Mori, Osaka (JP); Makoto Shiraishi, Miyoshi (JP)

(73) Assignees: SHARP KABUSHIKI KAISHA, Osaka-shi (JP); J.S.T. MFG. CO., LTD., Osaka-shi (JP)

( * ) Notice: Subject to any disclaimer, the term of this patent is extended or adjusted under 35 U.S.C. 154(b) by 0 days.

(21) Appl. No.: 13/854,282

(22) Filed: Apr. 1, 2013

(65) Prior Publication Data
US 2013/0293771 A1 Nov. 7, 2013

(30) Foreign Application Priority Data

Mar. 30, 2012 (JP) .................................. 2012-080386

(51) Int. Cl.
*H04N 5/225* (2006.01)
*G03B 17/02* (2006.01)

(52) U.S. Cl.
CPC .............. *H04N 5/2252* (2013.01); *G03B 17/02* (2013.01); *H04N 5/2257* (2013.01)

(58) Field of Classification Search
None
See application file for complete search history.

(56) References Cited

U.S. PATENT DOCUMENTS

| | | | | |
|---|---|---|---|---|
| 6,151,065 A | * | 11/2000 | Steed et al. | 348/148 |
| 8,482,665 B2 | * | 7/2013 | Jeon et al. | 348/374 |
| 8,861,951 B2 | * | 10/2014 | Warren et al. | 396/541 |
| 2006/0171704 A1 | * | 8/2006 | Bingle et al. | 396/419 |
| 2010/0097519 A1 | * | 4/2010 | Byrne et al. | 348/373 |
| 2011/0053398 A1 | * | 3/2011 | Arai et al. | 439/271 |
| 2013/0242099 A1 | * | 9/2013 | Sauer et al. | 348/148 |
| 2014/0168507 A1 | * | 6/2014 | Renaud | 348/373 |
| 2014/0300742 A1 | * | 10/2014 | Han | 348/148 |
| 2014/0354878 A1 | * | 12/2014 | Winter et al. | 348/374 |
| 2015/0029337 A1 | * | 1/2015 | Uchiyama et al. | 348/148 |

FOREIGN PATENT DOCUMENTS

JP 4623744 2/2011

* cited by examiner

*Primary Examiner* — Sinh Tran
*Assistant Examiner* — Shahbaz Nazrul
(74) *Attorney, Agent, or Firm* — Kratz, Quintos & Hanson, LLP

(57) ABSTRACT

A front case 50 accommodates a substrate 30 on which female contacts 90 are mounted. The female contacts 90 are accommodated in a housing 70. From a rear portion 61 of a rear case 60, male contacts 80 protrude forward. The front protrusion 80*a* of each male contact 80 is provided inside a housing 62. When a housing 62 is fitted with a housing 70, each male contact 80 slides on and contacts leading ends 91*a* and 92*a* in the direction in which the housings are fitted.

5 Claims, 9 Drawing Sheets

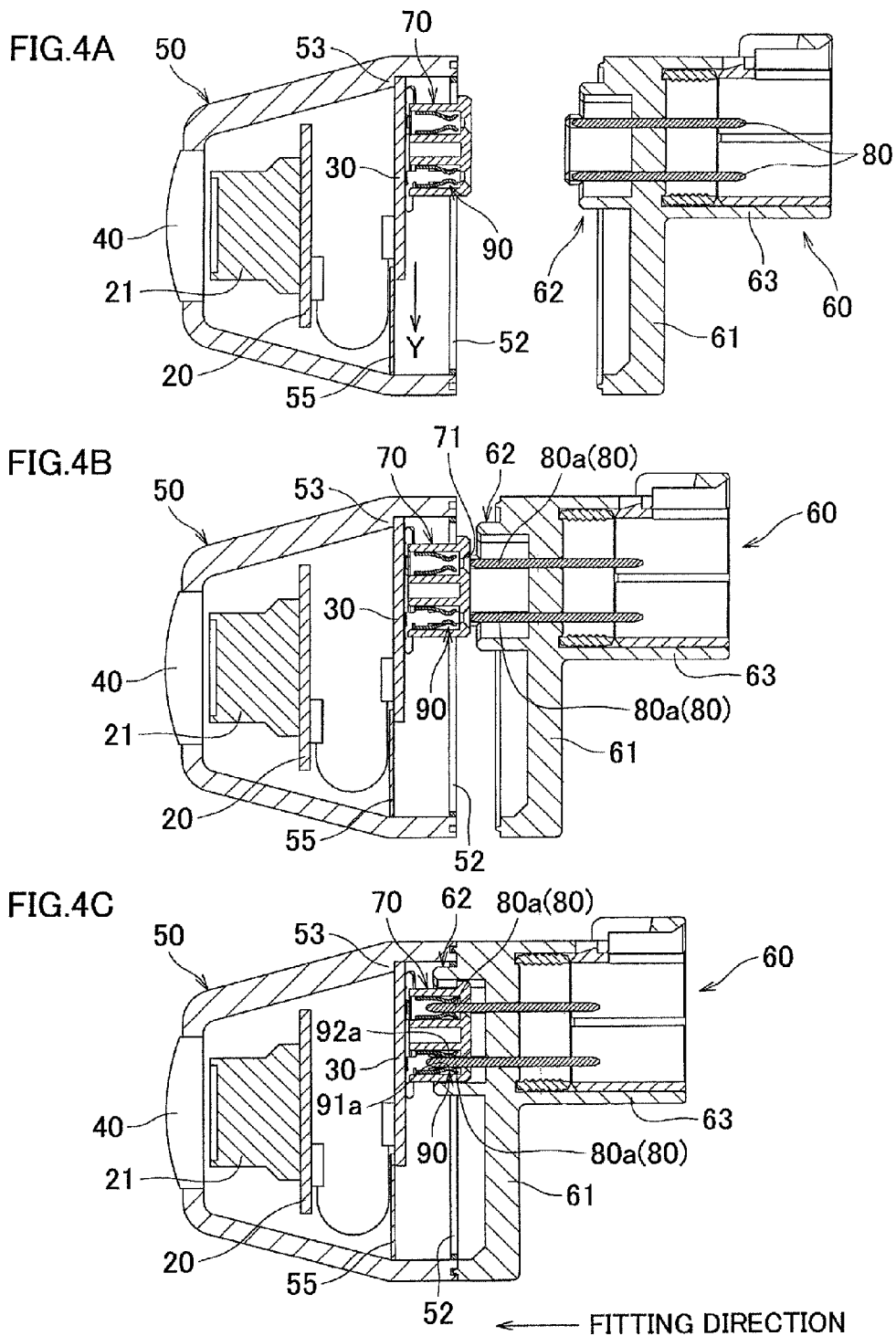

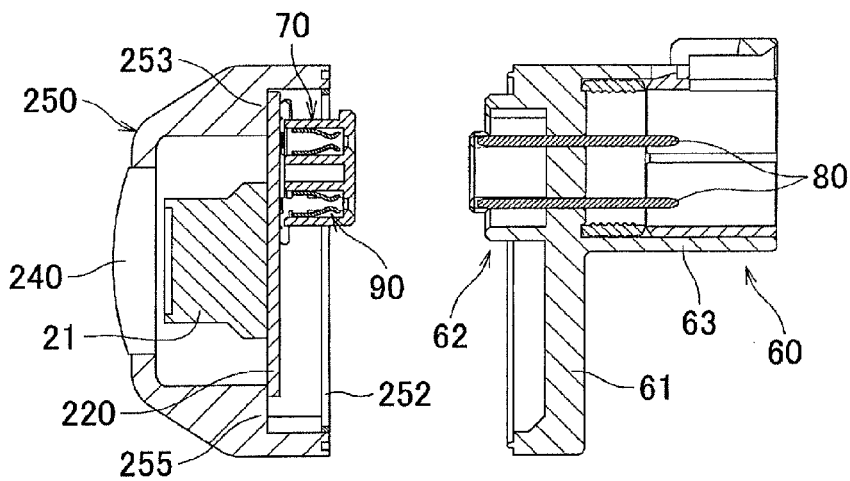
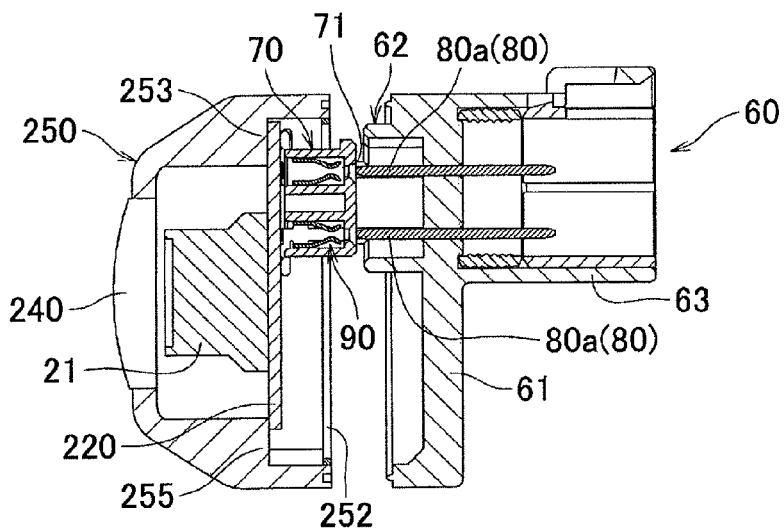
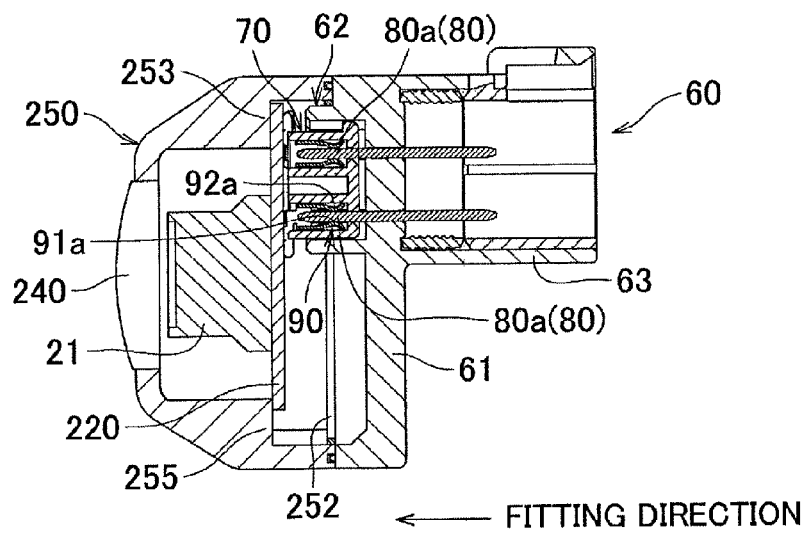

IMAGING APPARATUS

CROSS REFERENCE TO RELATED APPLICATION

The present application claims priority from Japanese Patent Application No. 2012-080386, which was filed on Mar. 30, 2012, the disclosure of which is herein incorporated by reference in its entirety.

BACKGROUND OF THE INVENTION

The present invention relates to an imaging apparatus including a substrate on which an image sensor is mounted.

A Known imaging apparatus mounted on a vehicle or the like disclosed in Patent Literature 1 (Japanese Patent No. 4623744) includes a camera case and a substrate which is accommodated in the camera case and on which an image sensor is mounted. The camera case is constituted by an upper camera case (front case) to which a protector is attached to protect the lens and a lower camera case (rear case) with which an external connector is fit, and the lower camera case is provided with a first contact electrically connected to the external connector. Furthermore, on the substrate accommodated in the camera case, an image sensor and a second contact electrically connected to the image sensor are mounted. As the first contact of the lower camera case is electrically connected with the second contact of the substrate, the external connector is electrically connected to the image sensor.

SUMMARY OF THE INVENTION

In the apparatus recited in Patent Literature 1, the leading end portion of the second contact mounted on the substrate is constituted by a V-shaped elastic contactor bended toward the first contact, and the second contact is displaced away from the first contact. For this reason, when the first contact is pressed onto the second contact, the second contact elastically deforms in the direction away from the first contact, and a restoring force of restoring the shape before the deformation is generated in the second contact. As a result, because a force away from the upper camera case (i.e., a force directed from the first contact to the second contact) is exerted to the first contact and the lower camera case where the first contact is provided, the lower camera case is easily detached from the upper camera case.

The apparatus recited in Patent Literature 1 is further disadvantageous in that, because the first contact is pressed onto the second contact, an electric connection failure may occur between the first contact and the second contact when dust or an oxide film exists at the junction between the first contact and the second contact.

An object of the present invention is to provide an imaging apparatus in which a lower camera case is not easily detached from an upper camera case and an electric connection failure between a first contact and a second contact is prevented.

An imaging apparatus of the present invention includes: a first case to which at least one of a lens component and a protector protecting the lens component is attached and which is formed to oppose at least one of the lens component and protector attached; a first substrate on which a first contact electrically connected to an image sensor is mounted and which is provided in the first case; and a second case that closes the opening of the first case, the first case including a supporting portion that supports the first substrate to be movable in planar directions of the first substrate, a first housing that accommodates the first contact being fixed to the first substrate, the second case including a second housing with which the first housing is fitted, inside the second housing, a second contact electrically connected to the first contact protruding from a bottom portion of the second housing, and when the first housing is fitted with the second housing, the second contact sliding on and contacting the first contact in a direction in which the first housing is fitted with the second housing.

According to the present invention, when the first housing is fitted with the second housing, the second contacts slides on the first contacts in the direction in which the first and second housings are fitted, and hence the generation of a force directed from the first contacts to the second contacts is restrained in the second contacts. As the force directed from the first case to the second case is restrained in the second contacts and the second case in which the second contacts are provided, the detachment of the second case from the first case is restrained. Furthermore, as the second contacts slide on and contact the first contacts; dust, an oxide film or the like at the junction therebetween is scraped off. This prevents the electric connection failure between the first contacts and the second contacts. Furthermore, because the second substrate and the first housing fixed to the second substrate are movable in the planar directions of the second substrate with respect to the first case thanks to the supporting portions provided on the inside surfaces of the first case, the relative positions of the first housing and the second housing are adjustable at the time of the fitting.

In addition to the above, according to the present invention, preferably, the imaging apparatus further includes a second substrate on which the image sensor is mounted and which is provided between the first substrate and at least one of the lens component and the protector attached to the first case. Because this arrangement allows the second substrate to be movable independently of the first substrate, it becomes easy to cause the optical axis of the image sensor to agree with at least one of the optical axis of the lens component and the optical axis of the protector. This increases the design freedom.

In addition to the above, according to the present invention, preferably, a side wall of the second housing includes an extended portion which extend to be further than a leading end of the second contact from the bottom portion, in a direction in which the second contact protrudes. According to this arrangement, the extended portion of the second housing is fitted with the first housing when the operation to fit the second housing with the first housing starts, and then second contact is correctly inserted into the first housing. This prevents the fracture, bending, breakdown or the like of the second contacts.

The imaging apparatus of the present invention causes the second case not to be easily detached from the first case and prevents electric connection failure between the first contacts and the second contacts as the second contacts slide on and contact the first contacts.

BRIEF DESCRIPTION OF THE DRAWINGS

FIGS. 4A, 4B and 4C are cross sections showing a fitting process of the second housing and the first housing of FIG. 1.

FIGS. 9A, 9B and 9C are cross sections showing a fitting process of the first housing and the second housing shown in FIG. 7.

DESCRIPTION OF THE PREFERRED EMBODIMENTS

Now, a preferred embodiment of the present invention will be described with reference to figures.

First Embodiment

Figure 1:
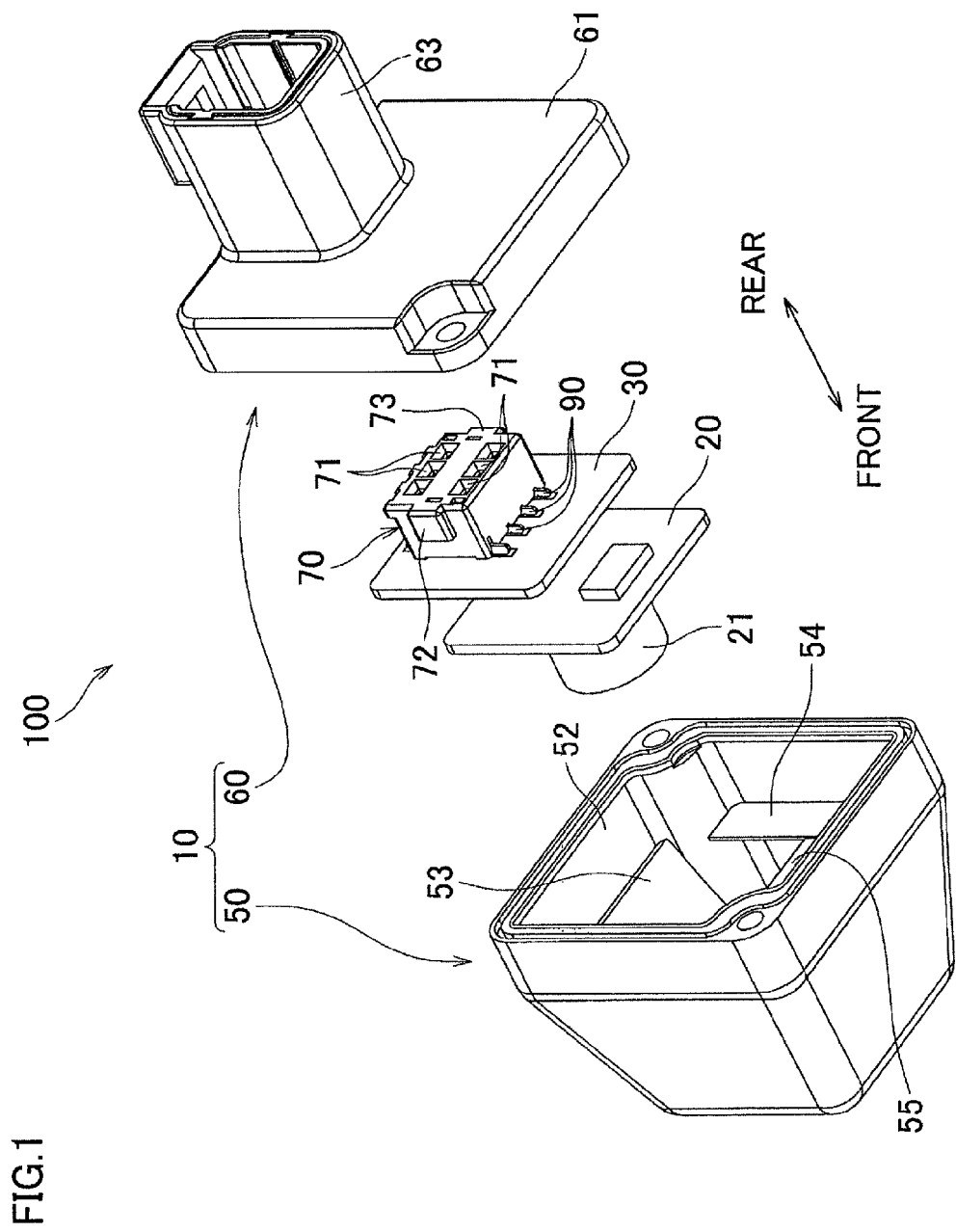
FIG. 1 is an exploded perspective view of an imaging apparatus according to First Embodiment of the present invention, and shows the imaging apparatus from the back.
Figure 2:
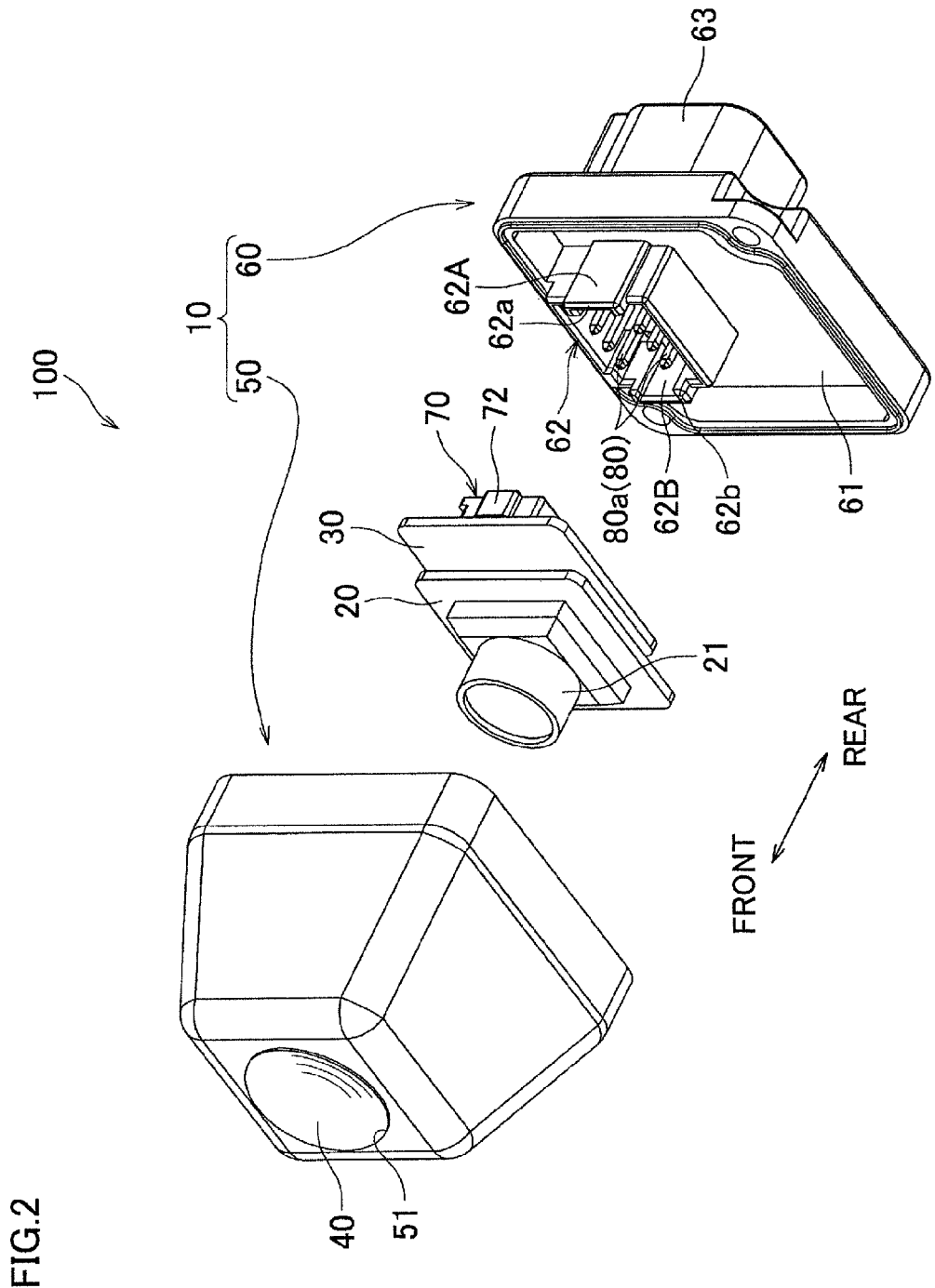
FIG. 2 is an exploded perspective view of the imaging apparatus according to First Embodiment of the present invention, and shows the imaging apparatus from the front.

FIG. 1 shows an imaging apparatus 100 from the back, whereas FIG. 2 shows the imaging apparatus 100 from the front.

(Overall Structure of Imaging Apparatus)

As shown in FIGS. 1 and 2, the imaging apparatus 100 includes a camera case 10 and substrates 20 and 30 accommodated in the camera case 10. As shown in FIG. 2, to the substrate 20 a lens component 21 is attached. The imaging apparatus 100 is mounted on a vehicle or the like to film the scenery around the vehicle.

[Camera Case]

The camera case 10 includes a box-shaped front case (first case) 50 to which a protector 40 protecting the lens is attached and a rear case (second case) 60 to which an external connector is connected. The front case 50 contacts the rear case 60 over a seal, and a waterproof structure is formed by fixing the cases to each other by a screw. The front case 50 and the rear case 60 are made of resin. Examples of the protector 40 include a transparent component made of resin or a transparent film.

<Front Case>

As shown in FIGS. 1 and 2, an opening 51 is formed at a front end portion of the front case 50 whereas an opening 52 is formed at a rear end portion of the front case 50. A protector 40 is provided at the opening 51 (see FIG. 2), and the opening 52 is formed to oppose the protector 40 (see FIG. 1). Furthermore, on inside surfaces of the front case 50 are formed stepped portions (supporting portions) 53, 54, and 55. The stepped portions 53, 54, and 55 are formed along the sides of the inside surfaces of the front case 50 such that each stepped portion extends along the substantially entire length of the side.

<Rear Case>

As shown in FIG. 2, the rear case 60 includes a rear portion 61 that closes the opening 52 at the rear end portion of the front case 50, a concave housing (second housing) 62 provided on the front surface of the rear portion 61, and a concave housing 63 provided on the rear surface of the rear portion 61. With the housing 62 on the front surface of the rear portion 61, a housing (first housing) 70 fixed to the substrate 30 is fitted. With the housing 63 on the rear surface of the rear portion 61, an external connector is fitted.

As shown in FIGS. 2 and 3, into the rear portion 61 are inserted a plurality of long conductive male contacts (second contacts) 80. A front protrusion 80a of each male contact 80 protrudes forward from the front surface of the rear portion 61, whereas a rear protrusion 80b protrudes backward from the rear surface of the rear portion 61. As shown in FIGS. 2 and 3, the front protrusion 80a is provided inside the housing 62 whereas the rear protrusion 80b is provided inside the housing 63.

In addition to the above, as shown in FIG. 2, two opposing side walls 62A and 62B of the housing 62 extend forward as compared to the leading end of the front protrusion 80a (male contact 80). In the present embodiment, in the respective side walls 62A and 62B, parts further from the rear portion 61 as compared to the leading end of the front protrusion 80a are termed extended portions 62a and 62b (see extended portion 62a shown in FIG. 3A).

Now, the substrates 20 and 30 accommodated in the camera case 10 will be described.

[Substrates]

As shown in FIGS. 1, 2, and 4, to the substrate (second substrate) 20 behind the protector 40, an image sensor which is a CCD sensor, a CMOS sensor or the like is mounted and the lens component 21 is attached. Furthermore, to the substrate (first substrate) 30 provided on the rear case 60 side, the housing 70 protruding toward the rear case 60 in a convex manner is fixed. The housing 70 is fixed to a surface of the substrate 30 which surface opposes the opening 52 when the substrate 30 is accommodated in the front case 50 (see FIG. 4A). Furthermore, the housing 70 accommodates a plurality of pairs of female contacts 90 mounted on the substrate 30. The female contacts 90 are mounted on a surface of the substrate 30 which surface opposes the opening 52 when the substrate 30 is accommodated in the front case 50 (see FIG. 4A). The substrate 20 is provided between the protector 40 and the substrate 30 and is connected to the substrate 30 by FPC or the like (see FIG. 4). With this, the image sensor mounted on the substrate 20 is electrically connected to the female contacts 90 mounted on the substrate 30.

Figure 3A:
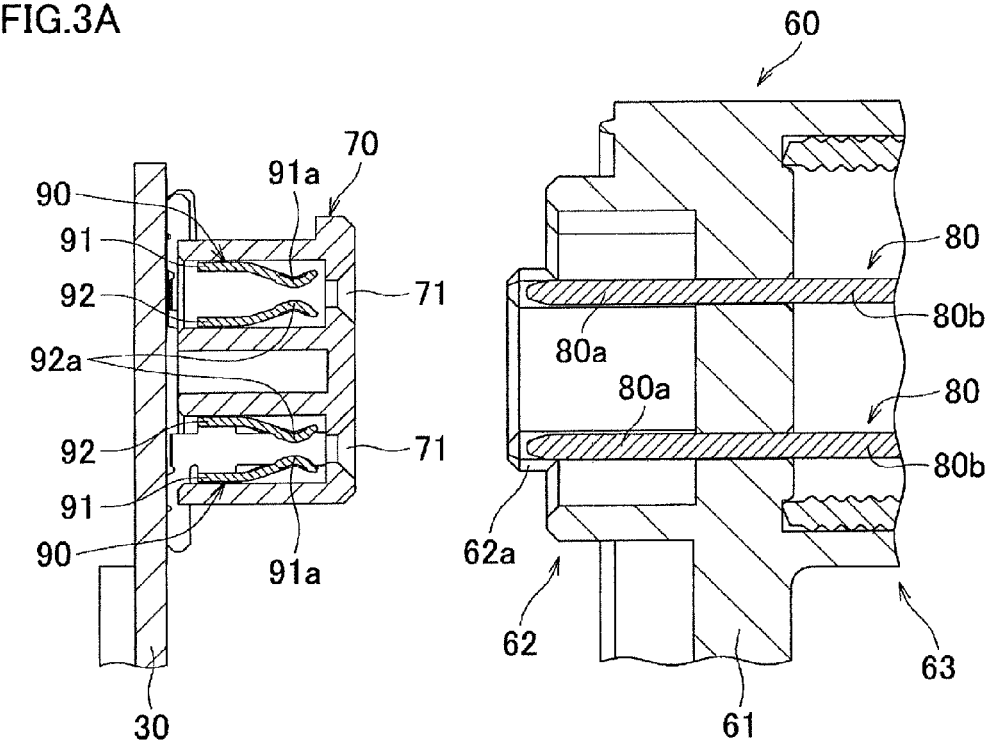
FIGS. 3A and 3B are cross sections of the female contact and the male contact shown in FIG. 1.

Furthermore, as shown in FIG. 1 and FIG. 3A, in the housing 70 fixed to the substrate 30, a plurality of concave portions 71 are formed to open toward the rear case 60. The concave portions 71 are formed to positionally correspond to the female contacts 90, and front protrusions 80a protruding from the front surface of the rear portion 61 are inserted into the respective concave portions 71 (see FIG. 3B). Furthermore, as shown in FIGS. 1 and 2, on the respective sides of the housing 70, protrusions 72 and 73 are formed to be able to fit with the extended portions 62a and 62b of the rear case 60, respectively (see FIG. 5A).

Now, referring to FIG. 3, the arrangement of the male contacts 80 and the arrangement of the female contacts 90 will be described.

[Female Contacts and Male Contacts]

As shown in FIG. 3A, a pair of female contacts 90 is constituted by two conductive contacts 91 and 92 opposing each other. Each of the contacts 91 and 92 is curved so that its leading end portion heads for the opposing contact (91 or 92). The contacts are closest to each other at their leading ends 91a and 92a.

Figure 3B:
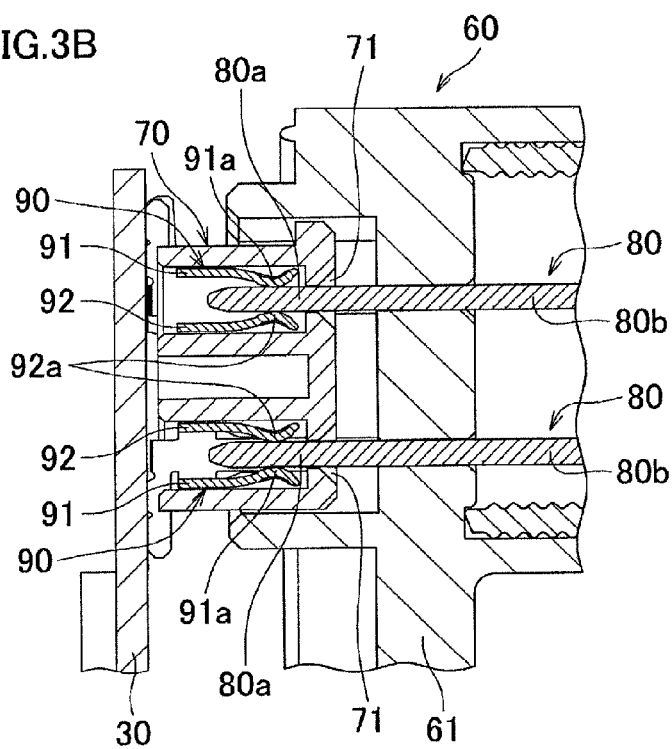

As the male contacts 80 are inserted into the concave portions 71 of the housing 70, each front protrusion 80a is inserted into the gap between the two contacts 91 and 92 and is sandwiched between the leading ends 91a and 92a. The front protrusion 80a is further inserted into the concave portion 71, with result that, as shown in FIG. 3B, the front protrusion 80a slides on and contacts the leading ends 91a and 92a opposing each other. With this, the female contact 90 and the male contact 80 are electrically connected with each other.

Figure 5A:
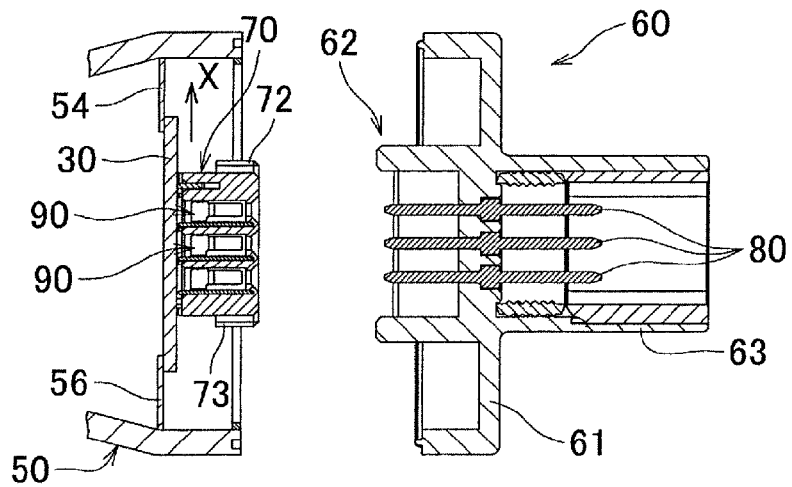
FIGS. 5A, 5B and 5C are cross sections showing the fitting process of the second housing and the first housing of FIG. 1.
Figure 5B:
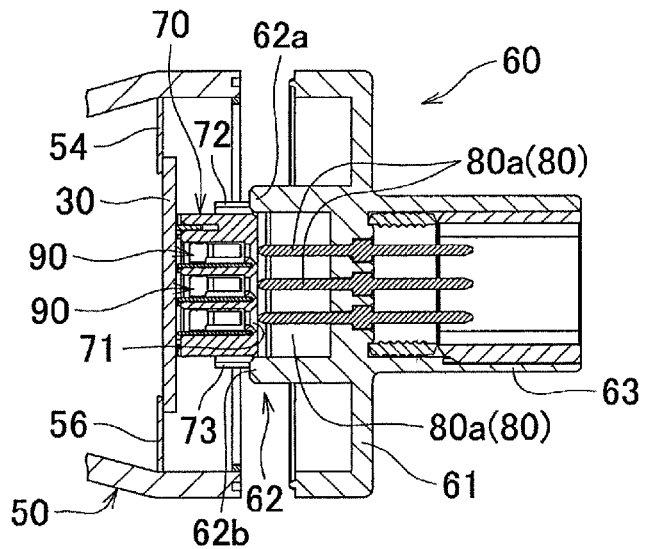
Figure 5C:
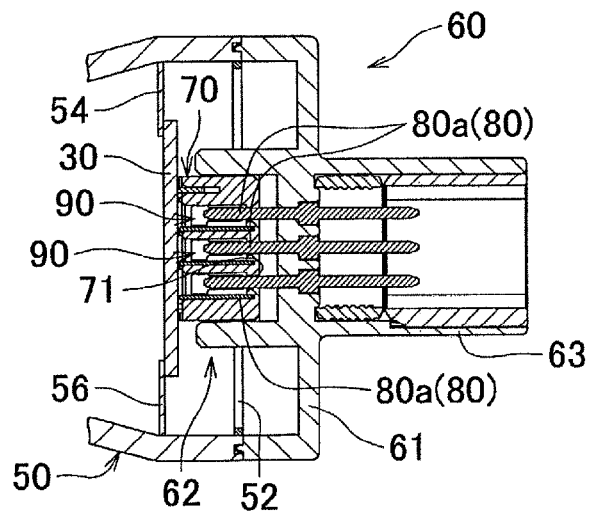
Figure 6:
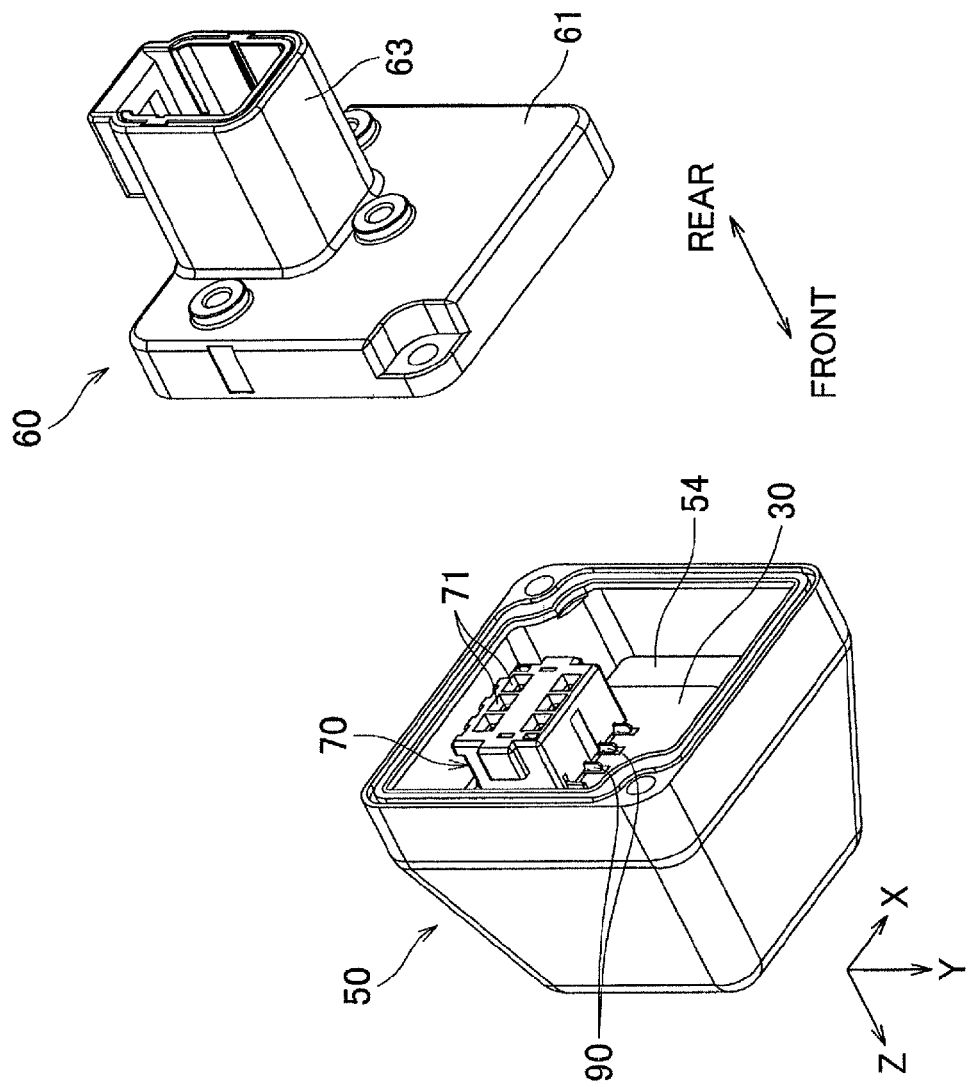
FIG. 6 is a perspective view showing a part of the fitting process of the second housing and the first housing of FIG. 1.

Now, referring to FIGS. 4 to 6, a process of constructing the imaging apparatus will be described. FIG. 4 and FIG. 5 show different cross sections, and FIG. 4A, FIG. 4B, and FIG. 4C correspond to FIG. 5A, FIG. 5B, and FIG. 5C, respectively. In FIG. 5, the front case 50 and the substrate 20 are not shown.

(Process of Constructing Imaging Apparatus)

As shown in FIG. 4A, the substrate 20 and the substrate 30 are accommodated in the front case 50. In so doing, the substrate 20 is fixed to the front case 50 so that the optical axis of the image sensor mounted on the substrate 20 agrees with the optical axis of the protector 40. Furthermore, the substrate 30 is positioned to contact the stepped portions 53, 54, 55, and 56 provided on the inside surfaces of the front case 50 (see FIG. 4A and FIG. 5A). In this regard, the substrate 30 is arranged to be movable in directions in planar directions of the substrate 30 while being supported by the stepped portions 53, 54, 55, and 56 (e.g., in the Y direction in FIG. 4A, in the X direction in FIG. 5A, and in the X, Y, and Z directions in FIG. 6).

Subsequently, the housing 62 is fitted with the housing 70. To begin with, as shown in FIG. 5B, the extended portions 62a and 62b of the housing 62 are fitted with the respective protrusions 72 and 73 of the housing (tentative fitting of the housings). In so doing, because the housing 70 is movable in the planer directions of the substrate 30 together with the substrate 30, it is possible to adjust the relative positions of the housing 62 and the housing 70 when the housings are fitted with each other. In this connection, the front protrusions 80a of the male contacts 80 have not been inserted into the concave portions 71 of the housing 70 (see FIG. 4B and FIG. 5B).

Thereafter, as shown in FIG. 4C and FIG. 5C, the housing 62 is completely fitted with the housing 70 and the opening 52 of the front case 50 is closed by the rear portion 61 of the rear case 60. The front protrusion 80a of each male contact 80 is inserted into the gap between a pair of female contacts 90, and slides on and contacts the leading ends 91a and 92a of the paired female contacts 90 in the direction in which the housing 62 is fitted with the housing 70. Then the rear portion 61 is fixed to the front case 50 by a screw.

Subsequently, an external connector is fitted with the housing 63 of the rear case 60. As a result, the external connector is electrically connected to the rear protrusions 80b of the male contacts 80. In consequence, the image sensor is electrically connected to the external connector.

As described above, the imaging apparatus of the present embodiment exerts the following effects. Because, when the housing 62 is fitted with the housing 70, the front protrusion 80a slides on the leading ends 91a and 92a in the fitting direction, the force directed from the housing 70 to the housing 62, which is applied to the housing 62, is restrained. This reduces the probability of the detachment of the rear case 60 from the front case 50.

Furthermore, because the front protrusion 80a of the male contact 80 slides on and contacts the leading ends 91a and 92a of the female contacts 90, dust, oxide film or the like at the front protrusion 80a at the leading ends 91a and 92a is scraped off, and hence connection failure between the male contacts 80 and the female contacts 90 is prevented.

Furthermore, inside the front case 50, the substrate 30 and the housing 70 are movable in the planar directions of the substrate 30 with the respect to the front case 50. It is therefore possible to adjust the relative positions of the housing 62 and the housing 70 when these housings are fitted with each other.

Furthermore, because the extended portions 62a and 62b of the housing 62 extend to be longer than the male contacts 80 from the bottom of the housing 70 in the direction in which the male contacts 80 protrudes, when the operation to fit the housing 62 with the housing 70 starts, the extended portions 62a and 62b of the housing are fitted with the protrusions 72 and 73 of the housing 70, and then the male contacts 80 are correctly inserted into the concave portions 71 of the housing 70. This prevents the fracture, bending, breakdown or the like of the male contacts 80.

In addition to the above, because the substrate 20 can be moved independently of the substrate 30, the optical axis of the image sensor is easily matched with the optical axis of the protector 40. The design freedom is therefore increased.

In addition to the above, because each male contact is inserted into the gap between the paired female contacts 90 and the male contact 80 slides on and contacts the female contacts 90 in the protruding direction of the male contacts 80 (i.e., in the direction vertical to the plane of the substrate 30), enough spaces for providing the male contacts 80 and the female contacts 90 are secured in the planar directions of the substrate 30. This makes it possible to increase the freedom of the layout of the male contacts 80 and the female contacts 90.

Second Embodiment

Now, Second Embodiment of the present invention will be described. The imaging apparatus of the Second Embodiment is different from the imaging apparatus of the First Embodiment in that, while in First Embodiment the image sensor is mounted on and the lens component 21 is attached to the substrate 20 whereas the female contacts 90 are mounted on the substrate 30, in Second Embodiment an image sensor and female contacts 90 are mounted on and a lens component 21 is attached to a single substrate 220. In this embodiment, other members identical with those of First embodiment will be denoted by the same reference numerals and the descriptions thereof will not be repeated.

(Overall Structure of Imaging Apparatus)

Figure 7:
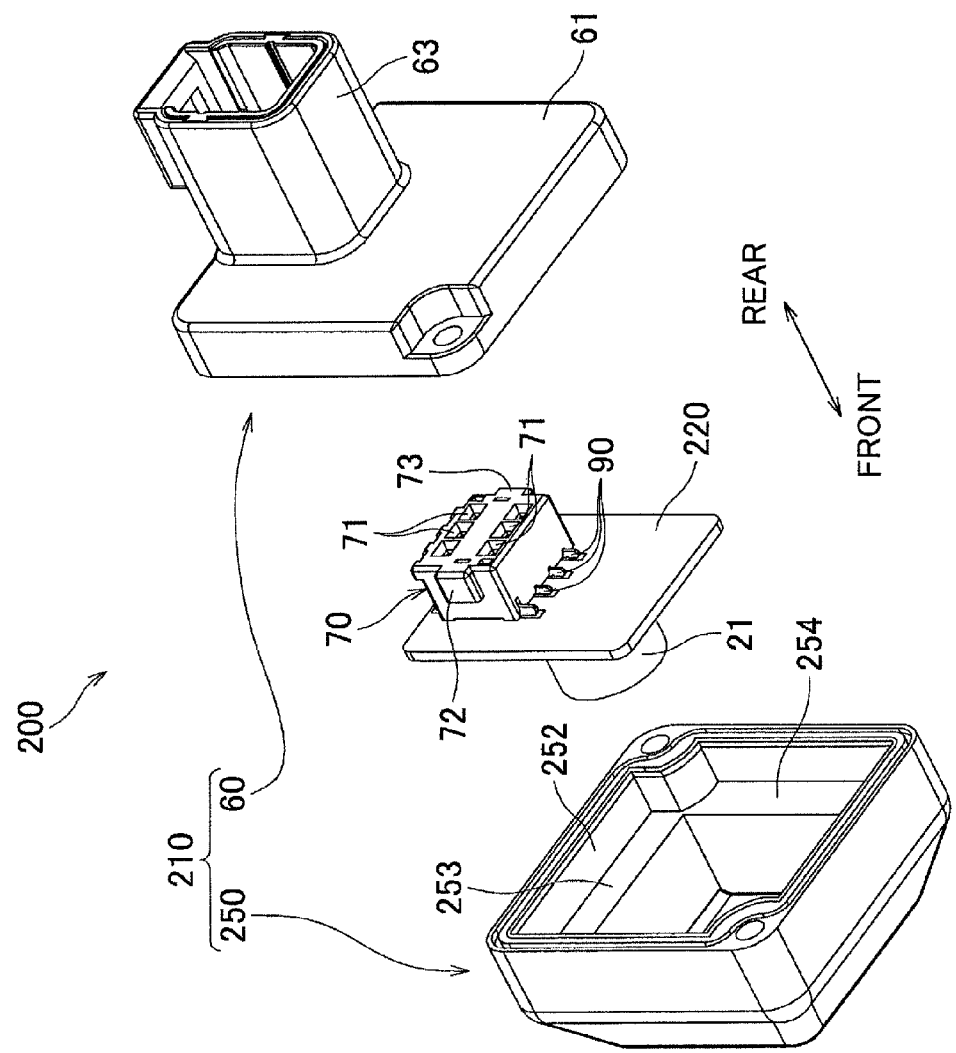
FIG. 7 is an exploded perspective view of an imaging apparatus according to Second Embodiment of the present invention, and shows the imaging apparatus from the back.
Figure 8:
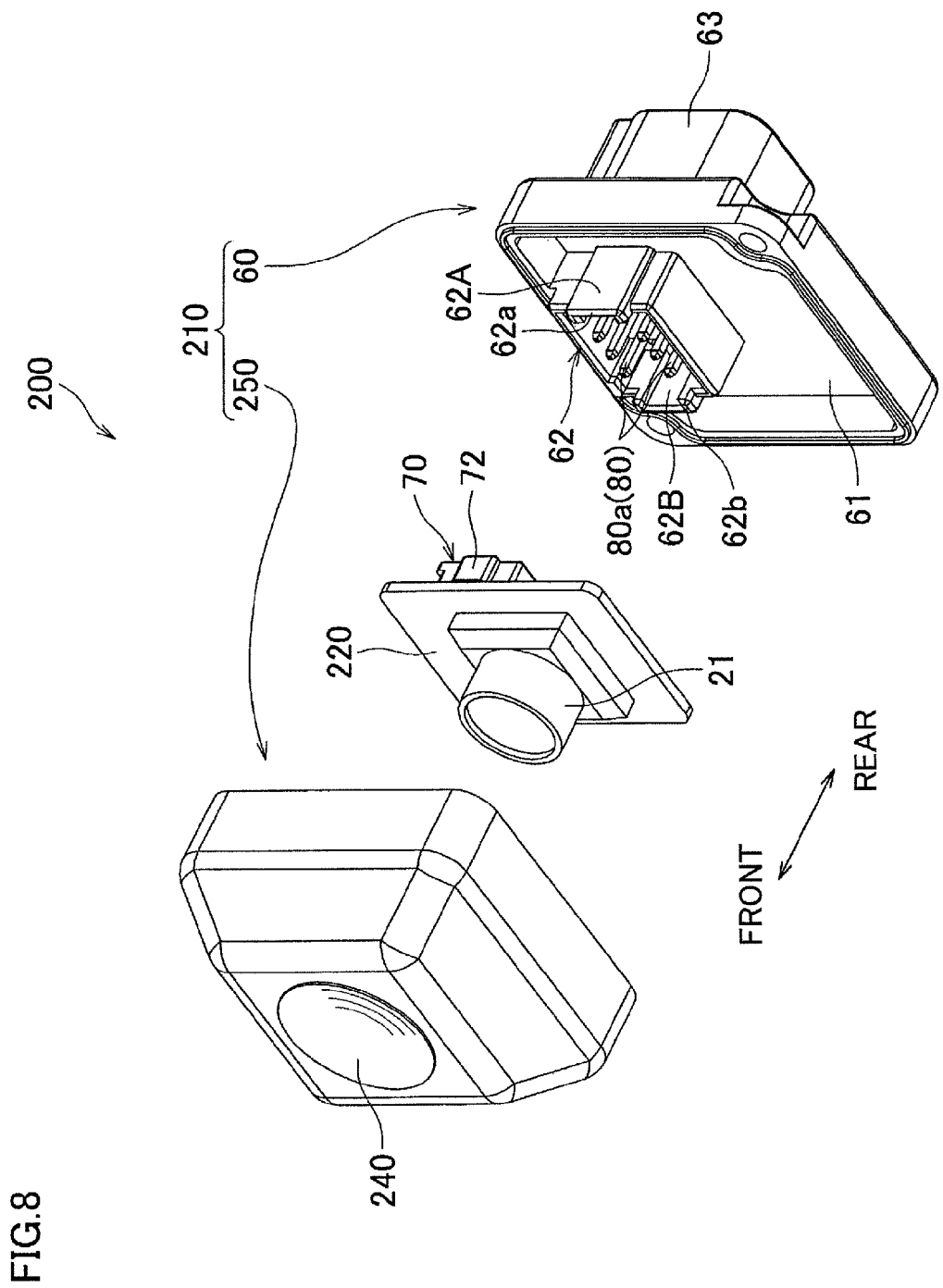
FIG. 8 is an exploded perspective view of an imaging apparatus according to Second Embodiment of the present invention, and shows the imaging apparatus from the front.

As shown in FIGS. 7 and 8, an imaging apparatus 200 includes a camera case 210 and a substrate 220 accommodated in the camera case 210. The camera case 210 includes a box-shaped front case (first case) 250 to which a protector 240 shown in FIG. 8 is attached and a rear case 60. As shown in FIG. 7, on the inside surfaces of the front case 250 are provided four stepped portions (supporting portions) (see the stepped portions 253 and 254 in FIG. 7). The four stepped portions are formed along the respective sides of the inside surface of the front case 250 such that each stepped portion extends along the substantially entire length of the side.

[Substrates]

As shown in FIGS. 7 and 8, on the substrate (first substrate) 220, an image sensor such as a CCD sensor or a CMOS sensor is mounted on and a lens component 21 is attached to a surface opposing the protector 240. Furthermore, in the substrate 220, on a surface opposing the opening 252 when the substrate 220 is accommodated in the front case 250, a housing 70 is fixed and female contacts 90 are mounted (see FIG. 9A).

(Process of Constructing Imaging Apparatus)

As shown in FIG. 9A, the substrate 220 is accommodated in the front case 250 so that the optical axis of the image sensor agrees with the optical axis of the protector 240. In this connection, the substrate 220 is provided to contact the stepped portions 253 and 255 at the inside surfaces of the front case 250. The substrate 220 is arranged to be movable in the planar directions of the substrate 220 while being supported by the stepped portions 253, 254, and 255.

Subsequently, as shown in FIG. 9B, the housing 62 is tentatively fitted with the housing 70. In this regard, because the housing 70 is movable in the planar directions of the substrate 220 together with the substrate 220, it is possible to adjust the relative positions of the housing 62 and the housing 70.

Thereafter, as shown in FIG. 9C, the housing 62 is completely fitted with the housing 70 and the opening 252 of the front case 250 is closed by the rear portion 61 of the rear case 60.

As described above, in the imaging apparatus 200 of the present embodiment, the detachment of the rear case 60 from the front case 250 is restrained in the same manner as the imaging apparatus 100 of First Embodiment.

While preferred embodiments of the invention have been described in detail, the foregoing description is in all aspects illustrative and not restrictive. It is understood that numerous other modifications and variations can be devised without departing from the scope of the invention.

For example, while in First Embodiment and Second Embodiment the male contacts 80 are inserted into the rear portion 61 of the rear case 60 and the female contacts 90 are mounted on the substrate 30, 220, female contacts may be provided on the rear case and male contacts may be mounted on the substrate. The shapes and structures of the male contacts and the female contacts may be changed.

Furthermore, while in First Embodiment and Second Embodiment the front case 50, 250 contacts the rear case over a seal or the like, such a seal may not be provided between the front case and the rear case.

While in First Embodiment and Second Embodiment each of the stepped portions 53, 54, 55, 56, 253, 254, and 255 formed on the inside surface of the front case 50, 250 extends along the substantially entire length of the side of each inside surface of the front case 50, 250, the arrangement of the stepped portion (e.g., shape and size) may be different. For example, each stepped portion may be a convex rib protruding from the inside surface of the front case.

In addition to the above, while in First Embodiment the stepped portions 53, 54, and 55 are formed on all sides of the inside surfaces of the front case 50, the stepped portions may not be formed on all sides of the inside surfaces.

In addition to the above, while in First Embodiment and Second Embodiment the housing 70 protrudes toward the rear case 60 and the housing 62 has a concave shape, the housings may not be shaped in this way.

While in First Embodiment and Second Embodiment the lens component 21 is attached to the substrate 20, 220 (i.e., a substrate on which an image sensor is mounted), the lens component 21 may be attached to the front case 50, 250. For example, at the opening 51 of the front case 50, 250, the lens component 21 may be provided in place of the protector 40. Furthermore, the embodiments above may be modified such that two lens components are used and one of these lens components is attached to the substrate 20, 220 whereas the other one of the lens components is attached to the front case 50, 250. In this case, only the lens component may be provided at the opening 51 of the front case 50, 250, or a lens component to which a protector is attached may be provided. Furthermore, the protector 40 may be provided at the opening 51 of the front case 50, 250, and the lens component may be attached to the front case 50, 250 to be accommodated in the front case 50, 250.

In addition to the above, while in First Embodiment and Second Embodiment six-contact connector is used as shown in FIGS. 2, 3, 8, and the like, the number of contacts of the connector may be different.

In addition to the above, First Embodiment and Second Embodiment may be modified so that a reinforcing tub may be used for fixing the housing 70 to the substrate 30, 220.

In addition to the above, while in First Embodiment and Second Embodiment the protector 40 (240) and the front case 50 (250) to which the protector 40 (240) is attached are different components, the protector and the front case may not be different components. For example, a part of the front case may be formed by a transparent component (protector). Furthermore, the protector and the front case may be integrated by insertion molding.

In addition to the above, the arrangements (e.g., shapes and materials) of the lens component and the protector may be different from those described in First Embodiment and Second Embodiment.

What is claimed is:

1. An imaging apparatus, comprising:
   a lens component;
   a protector protecting the lens component;
   a first case to which at least one of the lens component and the protector is attached, the first case having an opening which is formed to oppose the at least one of the lens component and the protector attached to the first case;
   a first substrate on which at least one first contact electrically connected to an image sensor is mounted and which is provided in the first case; and
   a second case that closes the opening of the first case,
   the first case including supporting portions protruding inward from different parts of inside surfaces of the first case to form supporting surfaces facing in the same direction as the opening,
   a first housing that accommodates the at least one first contact being fixed to the first substrate,
   the second case including a second housing with which the first housing is fitted,
   inside the second housing, a second contact electrically connected to the at least one first contact protruding from a bottom portion of the second housing,
   when the first housing is fitted with the second housing, the second contact is sliding on and contacting the at least one first contact in a direction in which the first housing is fitted with the second housing, and
   when the first housing is fitted with the second housing, the first substrate being movable in a direction orthogonal to the direction in which the first housing is fitted with the second housing, while a periphery of the first substrate contacts with the supporting surfaces.

2. The imaging apparatus according to claim 1, further comprising:
   a second substrate on which the image sensor is mounted and which is provided between the first substrate and the at least one of the lens component and the protector attached to the first case.

3. The imaging apparatus according to claim 1 or 2, wherein,
   a side wall of the second housing includes an extended portion which extend to be further than a leading end of the second contact from the bottom portion, in a direction in which the second contact protrudes.

4. The imaging apparatus according to claim 1, wherein,
   the supporting surfaces include a first supporting surface and a second supporting surface formed at parts of the inside surfaces of the first case, which parts oppose each other, and the width of the first supporting surface is wider than the width of the second supporting surface in a direction in which the parts oppose each other, and the first substrate is disposed to be closer to a base end of the second supporting surface than to a base end of the first supporting surface.

5. The imaging apparatus according to claim 1, wherein, the at least one first contact includes a pair of first contacts, the first housing accommodates the pair of first contacts being fixed to the first substrate, the first housing includes a concave portion which opens toward the second case and which positionally corresponds to a gap between the pair of first contacts, inside the second housing, the second contact is electrically connected to the pair of first contacts protruding from the bottom portion of the second housing, and when the first housing is fitted with the second housing, the second contact is inserted into the concave portion and slides on and contacts the pair of first contacts in the direction in which the first housing is fitted with the second housing.

\* \* \* \* \*